US009764784B2

(12) United States Patent
Brazier

(10) Patent No.: US 9,764,784 B2
(45) Date of Patent: Sep. 19, 2017

(54) TRACK ASSEMBLY WITH INNER AND OUTER SUPPORT WHEELS

(71) Applicant: Glen Brazier, Karlstad, MN (US)

(72) Inventor: Glen Brazier, Karlstad, MN (US)

( * ) Notice: Subject to any disclaimer, the term of this patent is extended or adjusted under 35 U.S.C. 154(b) by 0 days.

(21) Appl. No.: 14/998,605

(22) Filed: Jan. 26, 2016

(65) Prior Publication Data

US 2017/0210434 A1 Jul. 27, 2017

(51) Int. Cl.
| B62D 5/08 | (2006.01) |
| B62D 55/08 | (2006.01) |
| B62D 55/24 | (2006.01) |
| B62D 55/104 | (2006.01) |
| B62D 55/10 | (2006.01) |
| B62D 11/20 | (2006.01) |
| B62D 55/065 | (2006.01) |
| B62D 55/14 | (2006.01) |

(52) U.S. Cl.
CPC .............. *B62D 55/08* (2013.01); *B62D 11/20* (2013.01); *B62D 55/065* (2013.01); *B62D 55/10* (2013.01); *B62D 55/104* (2013.01); *B62D 55/14* (2013.01); *B62D 55/24* (2013.01)

(58) Field of Classification Search
CPC ...... B62D 55/08; B62D 55/24; B62D 55/104; B62D 55/14; B62D 11/20; B62D 55/065; B62D 55/10
See application file for complete search history.

(56) References Cited

U.S. PATENT DOCUMENTS

| 4,708,218 A * | 11/1987 | Makela | B62D 55/08 180/9.1 |
| 4,719,983 A * | 1/1988 | Bruzzone | B62K 13/00 180/183 |
| 7,182,165 B1 * | 2/2007 | Keinath | B62M 27/02 180/185 |
| 8,702,183 B2 * | 4/2014 | Yoshida | B62D 55/104 305/132 |
| 2014/0231157 A1 * | 8/2014 | Green | B62D 55/02 180/9.54 |

* cited by examiner

*Primary Examiner* — Kevin Hurley
(74) *Attorney, Agent, or Firm* — D. L. Tschida

(57) ABSTRACT

An endless track assembly that mounts to a vehicle drive linkage. The track assembly includes a belted track, drive sprocket and serial sets of pivoting internal idler wheel rocker suspensions that support interior track surfaces. Pinch wheels are supported in contact with the terrain engaging track surface. Frame and/or sprocket mounted tensioners establish track tension. Resilient torsion support assemblies, rollers and/or layers of resilient and/or slippery materials are incorporated between the track assembly and vehicle frame/chassis to prevent damage to the vehicle as the track assembly rises and falls with terrain changes.

16 Claims, 10 Drawing Sheets

TRACK ASSEMBLY WITH INNER AND OUTER SUPPORT WHEELS

BACKGROUND OF THE INVENTION

The present invention relates to tracked vehicles and, in particular, to an extended length, shape changing track assembly that extends a substantial length of a vehicle and flexes with differing types of terrain without contacting the vehicle.

A wide variety of personal and commercial all terrain vehicles have been developed for travel over off road terrain such as desert, tundra, river beds, sodden fields and other unfriendly surface conditions including mud, sand, rocks, timber etc. These vehicles typically support at least one pair of track assemblies from a chassis mounted suspension. Some of the track assemblies permit conversion of wheeled vehicles to track vehicles.

Of the latter type of track assemblies, some also provide for pivoting idler wheel supports that follow changes in terrain contours and control and counter-act track flexion. U.S. Pat. Nos. 6,904,986; 7,131,508; 7,533,741; and 7,597,161 disclose track assemblies of the foregoing types.

Although the foregoing track assemblies have proven very beneficial for use with light to medium weight vehicles, the assemblies are not able to accommodate many relatively heavier weight vehicles. The present elongated track support assemblies were therefore developed to support a wider range of vehicle types and load bearing capacities.

SUMMARY OF THE INVENTION

It is a primary object of the invention to provide an all terrain vehicle with an elongated drive track assembly that extends a substantial length of a vehicle and is capable of pivoting to follow terrain changes without damaging the vehicle.

It is further object of the invention to provide a drive track assembly wherein an extended track framework supports a plurality of idler wheels mounted in contact with interior surfaces of the track.

It is further object of the invention to provide a drive track assembly wherein an extended track frame supports a rotating drive sprocket that rotates a track supported between internally and externally mounted idler wheels that are positioned and tensioned to maintain sprocket contact and optimize power transfer to the track.

It is further object of the invention to provide a drive track assembly wherein a track support framework supports a plurality of pivoting, rocker arm type idler wheel suspensions in contact with bottom interior surfaces of the track opposite the over traveled terrain.

It is further object of the invention to provide a drive track assembly having idler wheels mounted to biased or unbiased rocker arm supports that independently pivot and permit the track to flex and re-shape itself to accommodate the geometry of the terrain contacting surface of the track relative to the terrain.

It is further object of the invention to provide a drive track assembly that longitudinally extends a substantial length of the vehicle and includes at least one torsion support fitted between the vehicle and a track support framework to vertically bias rotational movement of a track support framework relative to the vehicle to prevent vehicle or track damage in the event of contact there between.

It is further object of the invention to provide a drive track assembly that longitudinally extends a substantial length of the vehicle and includes a resilient (e.g. elastomeric assembly) to vertically bias rotational movement of a track support framework relative to the vehicle to prevent vehicle or track damage in the event of contact there between.

It is further object of the invention to provide a drive track assembly that includes means (e.g. rollers, bearings, slippery materials) that permit contact between the rotating track and vehicle without damaging the vehicle and/or track.

The present invention was developed to provide an improved track conversion assembly accommodative of heavier weight vehicles. A belted track of the assembly is supported in endless fashion about a drive sprocket and several sets of internal idler wheel rocker suspension frames that pivot relative to an elongated track support framework.

The track framework particularly supports a number of pivoting rocker arm suspensions having fore and aft idler wheels mounted between a center pivot. The idler wheels are mounted to align with longitudinal grooves at an interior track surface. Ground engaging lugs project from an exterior track surface to engage the terrain.

Inboard and outboard longitudinal arms of the track support framework include at least one set of idler "pinch" wheels mounted to contact the external, ground engaging surface of the track to pinch the track against the drive sprocket and maintain track tension. The external pinch wheels can be rigidly positioned or torsion biased to prevent separation of the track from the drive sprocket. Track contact with the terrain and the transfer of drive power from the rotating drive sprocket is thereby maintained and track dislodgment is further minimized via the internal channel mounted idler wheels.

A reciprocating, longitudinally extensible tensioner cooperates with end-mounted idler wheels to control track tension. A separate rotational tensioner operative to rotate the drive sprocket in an eccentric/off-center fashion relative to the rotational axis of a drive axle extending from the vehicle can further establish appropriate track tension.

A torsion support assembly mounted to the fore end of the track assembly between the vehicle framework and track framework restricts vertical movement of the track assembly. The torsion support cooperatively resists track assembly rotation to prevent the track assembly from engaging the vehicle as surface conditions pivot the track assembly about a passive or active vehicle drive axle.

In an alternative track assembly, resilient supports are mounted between fore and/or aft ends of the track assembly and support members at the vehicle to prevent damage to the vehicle in the event the track assembly rotates and contacts the vehicle. The fore and aft resilient supports are secured between the track and vehicle frames. The resilient supports can provide vertically extensible, reciprocating sections and/or rotational, torsion biased mounts to facilitate damage prevention.

Rollers and/or other slippery and/or resilient surfaces are also disclosed that can be incorporated between the track assembly and vehicle frame/chassis to prevent damage to the vehicle as the track assembly rises/falls with changes in the terrain and/or steering maneuvers.

The subject track assembly finds particular application for trucks and other multi-axle vehicles and equipment that transport heavy loads. The elongated assemblies distribute load weight over a significantly larger load bearing footprint than achievable with existing commercial wheel replacement track assemblies.

The foregoing objects, advantages and distinctions of the invention are obtained in alternative track assemblies disclosed and discussed below. Still other objects, advantages, distinctions, constructions and combinations of individual features of the invention will become more apparent from the following description with respect to the appended drawings. Similar components, assemblies and sub-assemblies are referred to in the various drawings with similar alphanumeric reference characters. The description to each feature and/or combination should therefore not be literally construed in limitation of the invention. Rather, the invention should be interpreted within the broad scope of the further appended claims.

BRIEF DESCRIPTION OF THE PREFERRED EMBODIMENT

Figure 1:
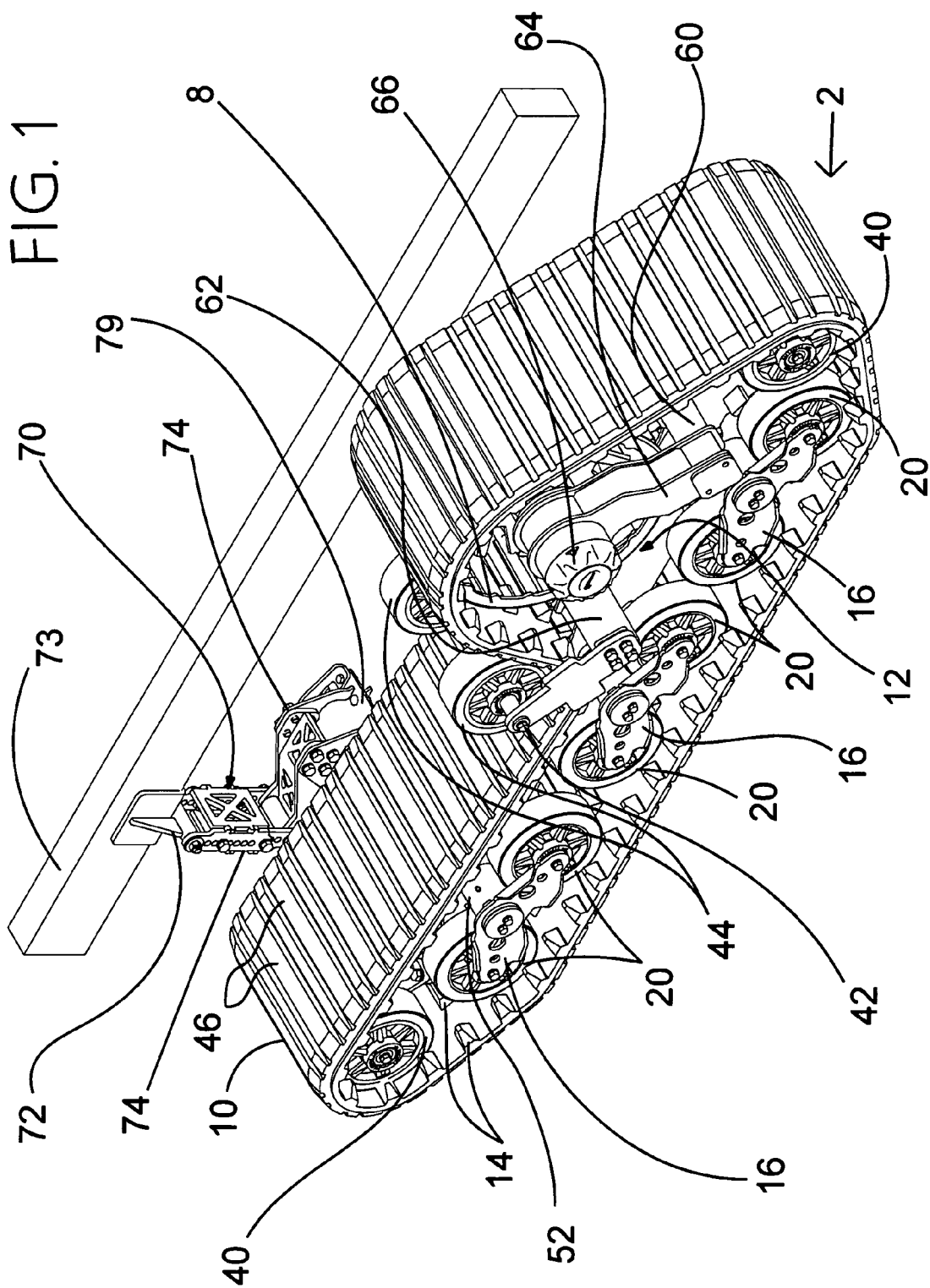
FIG. 1 is a perspective drawing showing outboard side and rear views of the track assembly of the invention relative to a vehicle frame support.
Figure 2:
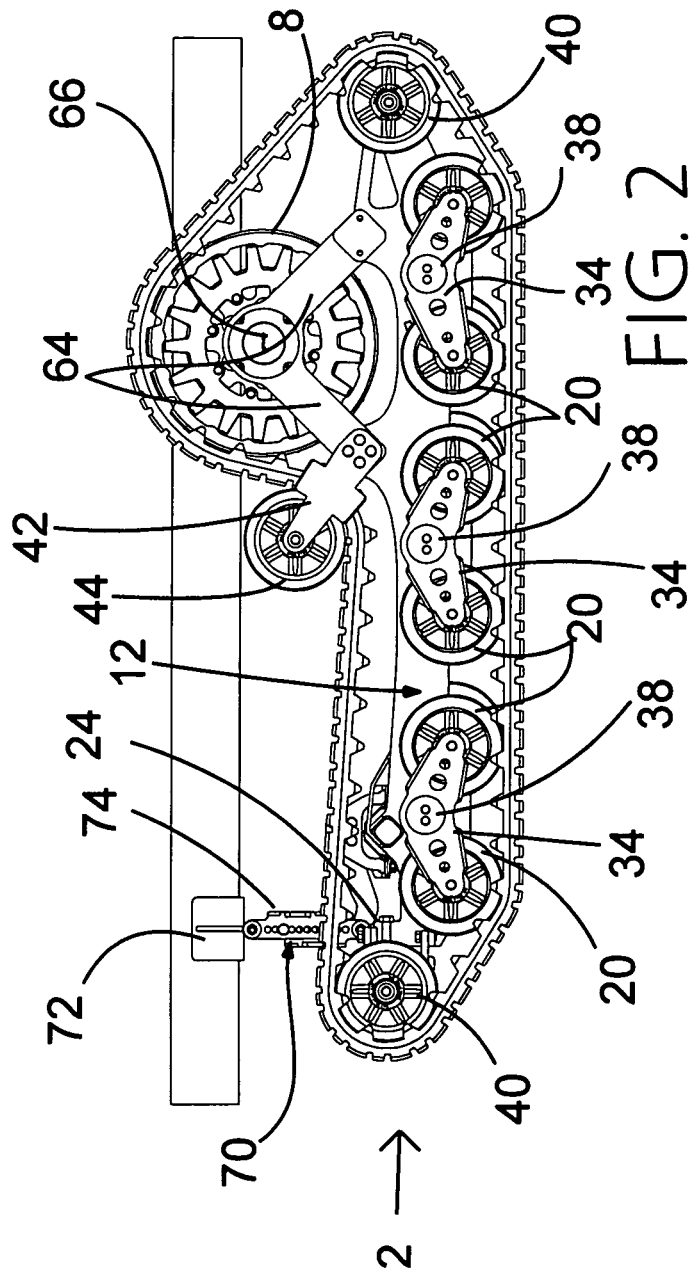
FIG. 2 shows an outboard side view of the track assembly relative to a vehicle frame member to which the track assembly's torsion support is mounted.
Figure 3:
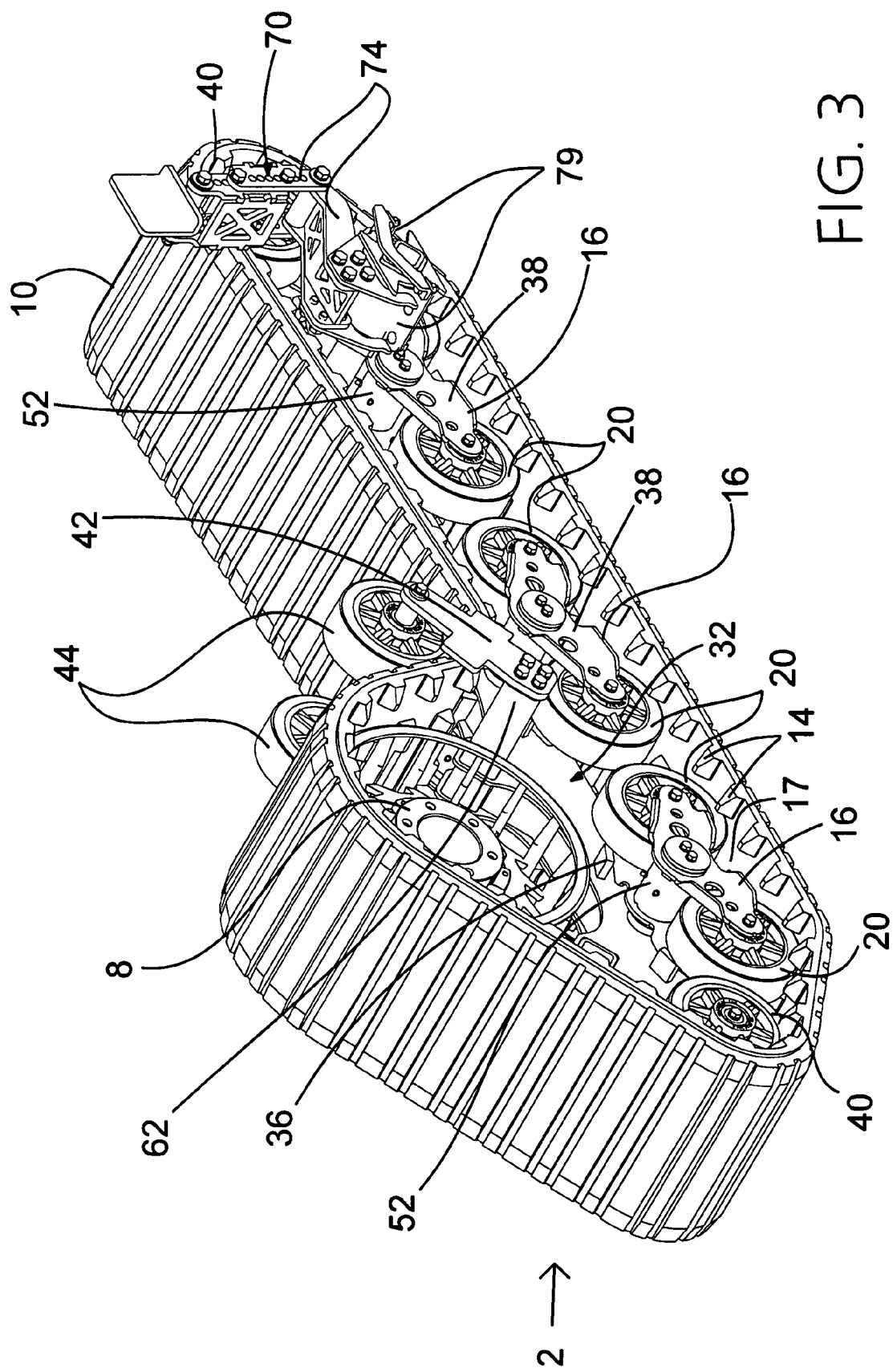
FIG. 3 is a perspective drawing showing inboard side and rear views of the track assembly of the invention relative to a forward mounted torsion frame support.
Figure 4:
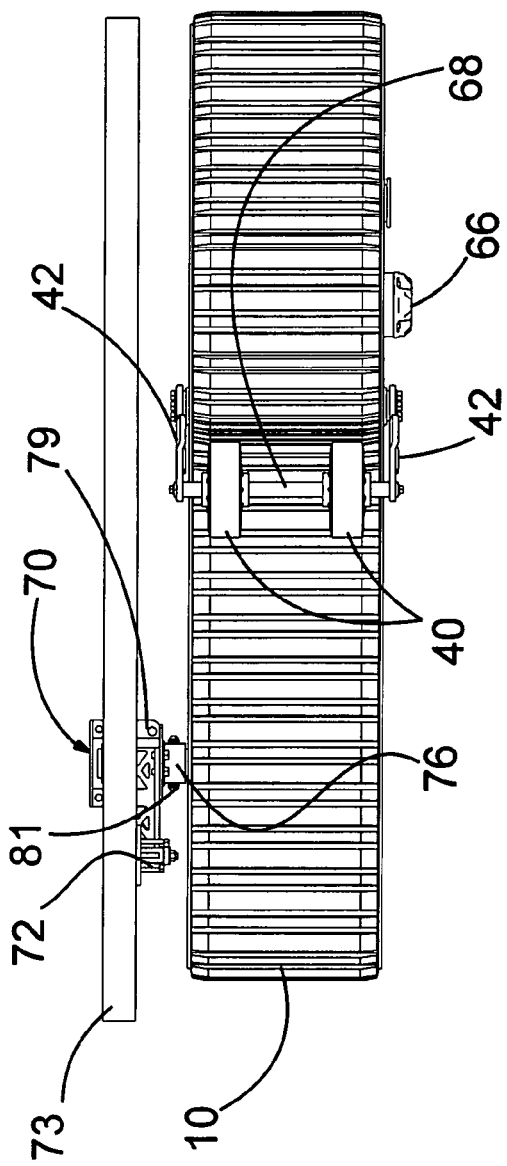
FIG. 4 shows a top view of the track assembly of the invention relative to a vehicle frame member to which the track assembly's torsion support is mounted.
Figure 5:
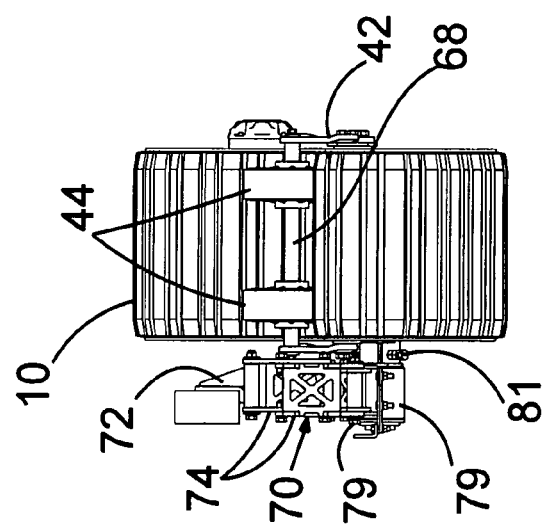
FIG. 5 shows an end view of the track assembly viewed toward the drive sprocket and outer track idler wheels of the invention relative to a vehicle frame member to which the track assembly's torsion support is mounted.

With attention to FIGS. 1 through 9 and 10 and 11, alternative drive track assemblies 2 and 4 are shown. The drive track assemblies 2 and 4 are secured to axles that extend from a supported vehicle. The axles can be powered or passive. The supported vehicle can be configured to any desired construction. In lieu of depicting vehicle configurations, one or more frame or chassis support members 73 of the vehicle are shown for the sake of simplicity. The subject drive track assemblies 2 and 4 can also be combined with other drive track assemblies to appropriately distribute loading and accommodate steering.

The drive track assemblies 2 and 4 are typically actively powered via driven axles extending from the vehicle and coupled to a drive sprocket 8 at the track assembly. However, in some circumstances and/or depending upon the vehicle or equipment type, the associated drive track assemblies 2 and/or 4 may be mounted to passively rotate as they distribute the vehicle's weight over uneven terrain. The drive track assemblies 2 and 4 are designed to mount and replace conventional wheels that are normally secured to vehicle axles.

The chassis (e.g. passenger, storage and cargo compartments) of the vehicle can be configured to any desired form and shape. Passenger, equipment support or cargo storage platforms or compartments can be included and/or configured on support frame members as desired to accommodate any desired load, whether for personnel and/or cargo or equipment transport. An associated drive suspension (not shown) can be configured as desired with an appropriately sized engine and drive linkage(s) and/or axles coupled to the track assemblies and 4.

The active and/or passive track assemblies 2 and 4 can be mounted to steer or passively follow the supported vehicle. The track assemblies 2 and 4 mount to couplers and/or linkages that extend between the track assemblies 2 and 4 the vehicle axle and vehicle and track assembly frames. Presently preferred linkages are described below. For driven track assemblies 2 and 4, drive power is supplied to each track assembly 2 and 4 via an appropriate drive linkage (not shown) coupled to the track framework and particularly a drive sprocket 8. Drive power can be provided from a gas or diesel engine, suitable DC electric motors or combinations thereof.

Steering track assemblies typically exhibit a relatively shorter longitudinal length and load bearing footprint versus the longer track assemblies 2 and 4 of the invention which are typically mounted to rear axles. With attention to FIGS. 1-9, the track assembly 2 includes a drive track 10 that is supported from the drive sprocket 8 and a metal framework 12. The framework 12 can be constructed of cast or plate metals that are cut, formed and/or welded to a preferred configuration. Whether or not actively powered, the drive sprocket 8 rotates to drive the track 10 as drive lugs, depressions or other suitable appendages or holes at the interior surface of the track 10 are contacted by suitable drive teeth or lugs at the drive sprocket 8. The drive sprocket 8 is presently supported to couple to drive lugs 14 that project from and span an interior surface of the track 10.

A series of paired left and right sets rocker arm suspensions 16 support paired fore and aft sets of idler wheels 20 that are aligned to engage interior longitudinal channels between the drive lugs 14 along the left and right lateral peripheral edges of the track 10. The shape, length and positioning of the drive lugs 14 can be varied as desired. The rocker arm suspensions 16 are mounted to pivot relative to the framework 12 to support the track 10. The rocker arm suspensions 16 pivot about pivot axles 52 that extend from the framework 12. The axles 52 are centered above and between the paired idler wheels 20 of each rocker arm suspension 16. The idler wheels 20 ride in grooves or channels formed between the drive lugs 14 and/or other shaped interior surfaces of the track 10.

Extending from a fore end of the framework 12 are left and right sets of interior road wheels 40. The road wheels 40 are longitudinally aligned with the rocker arm suspension idler wheels 20. The road wheels 40 contact the internal surface of the track 10, typically in the same channel space as the idler wheels 20. The forward road wheels 40 mount to a reciprocating, length extensible/retractable adjuster assembly 24 mounted to the framework 12. The forward road wheels 40 can be extended and retracted relative to the framework 12 to control the tension on the track 10. A separate set of road wheels 40 is mounted to an aft end of the framework 12, although could be deleted if desired.

The drive sprocket 8 can be mounted to permit an eccentric adjustment of is rotational center relative to the vehicle to vary track tension. Such a mounting provides an adjustment that stretches/relaxes the drive track 10 relative to the drive sprocket 8. For example, the drive sprocket 8 can mounted to an eccentric bearing having a transverse axle bore located off center. Upon fitting the bearing to a sprocket support axle extending from the vehicle, the eccentric bearing and sprocket 8 can be rotated about the vehicle axle to adjust the mounting location of the sprocket 8 in an eccentric cam lobe-like action relative to the track support framework 12. The eccentric rotation varies the track tension. Upon fixing the bearing position relative to the sprocket 8 and framework 12, the sprocket 8 rotates in normal fashion about the vehicle axle.

The diameter of the idler wheels 20 and road wheels 40 can be selected as desired. Presently, the road wheels 40 exhibit a diameter in a range of 10 to 12 inches. The intermediate idler wheels 20 at the rocker arm suspension assemblies 16 exhibit a diameter in the range of 5 to 8 inches.

The inclusion of multiple idler wheel rocker arm suspensions 16 forward of the drive sprocket 8 extends the track assembly 2 a substantially longer distance beneath the vehicle chassis. The drive sprockets 8 at the track assemblies 2 mount to the vehicle axles that typically project from rear wheel wells. Presently and for a typical passenger vehicle, the assembly 2 extends from the rear wheel well to the region just behind the forward driver or passenger doors. The track assembly 2 provides a ground contact footprint at the track 10 approximately 2× to 3× that of a shorter front track assembly that might be mounted to the vehicle's front steering axles.

Each track assembly 2 provides a framework 12 that supports a desired number of left and right rocker arm suspensions 16 and associated idler wheels 20 intermediate the forward and aft road wheels 40. Each rocker arm suspension 16 is mounted to pivot about a pivot axle 52 that transversely extends from the sides of the framework 12.

Paired sets of opposed, transversely aligned rocker arm suspensions 16 having a common rotational axis presently extend from opposed right and left sides of the framework 12. The resultant laterally displaced idler wheels 20 longitudinally align to independent longitudinal channels defined between the drive lugs 14 that project from the interior of the track 10. The idler wheels 20 rotate and pivot to support the track 10 to maintain contact between the terrain engaging exterior surface of the track 10 and the terrain. The rocker arm suspension 16 might be longitudinally staggered in non-symmetrical relation in certain circumstances.

Figure 6:
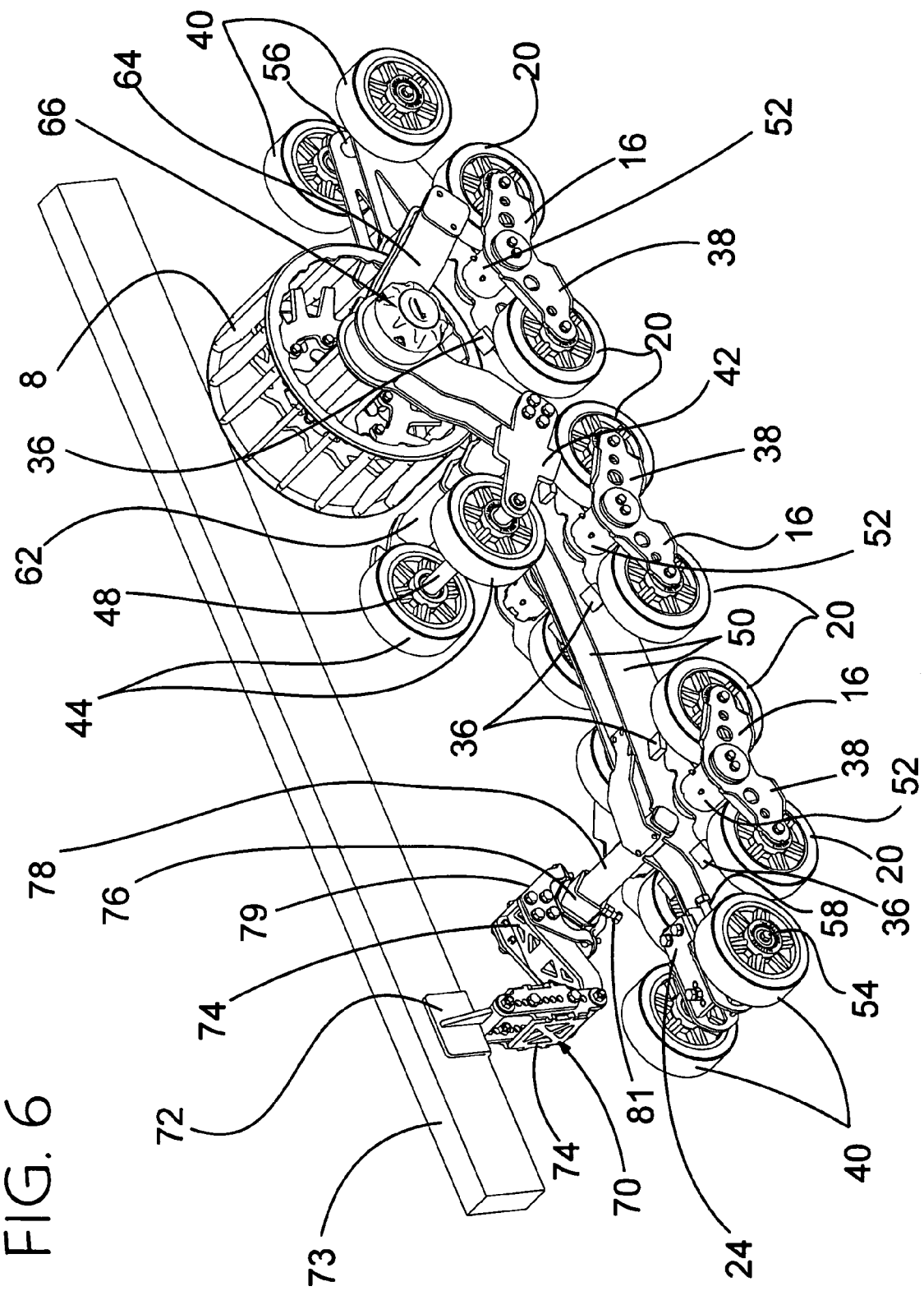
FIG. 6 is a perspective drawing with the track removed from the assembly showing outboard side and rear views of the track assembly relative to a vehicle frame member.
Figure 7:
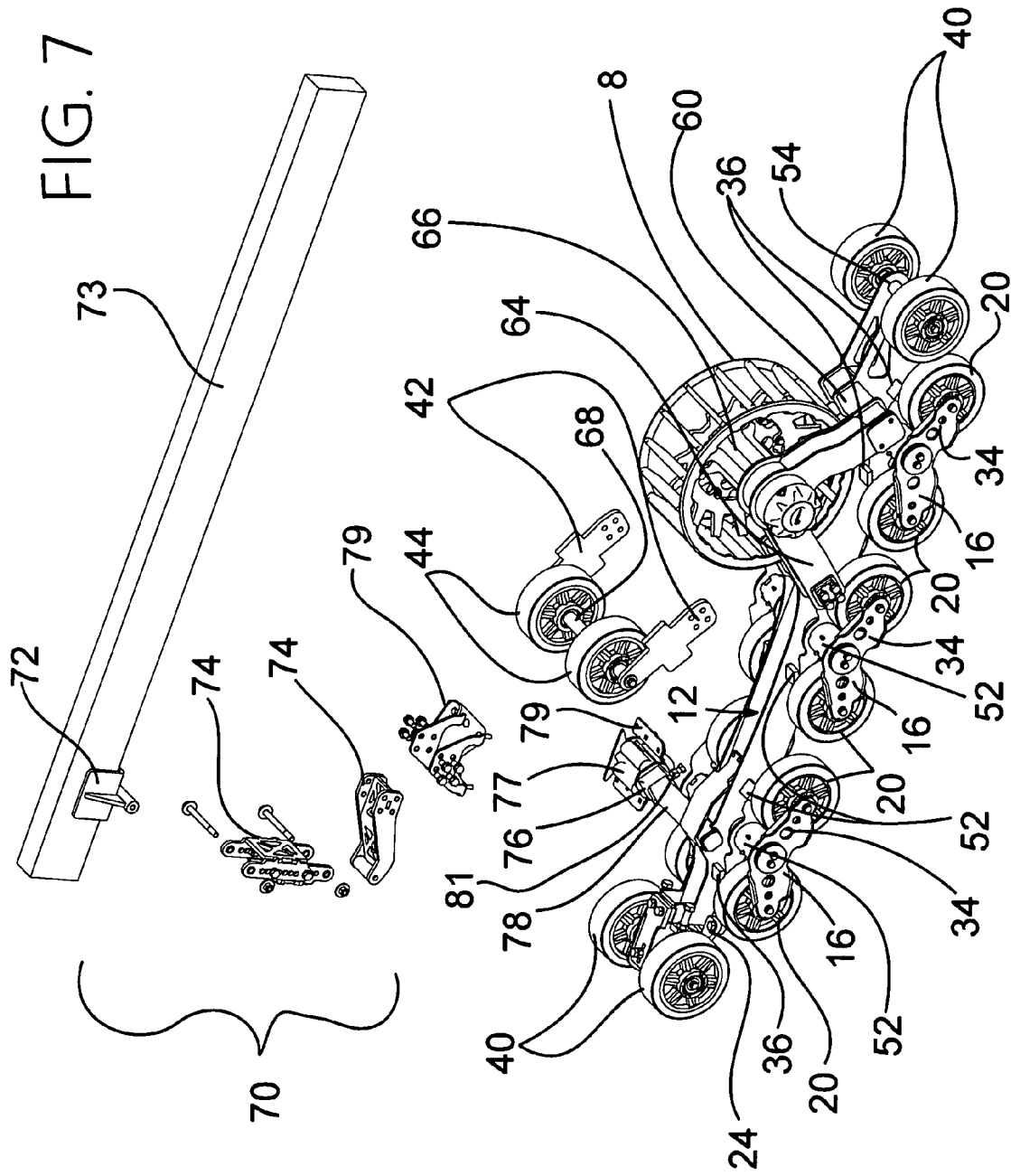
FIG. 7 is a perspective drawing with the track removed from the assembly in partial exploded view showing outboard side and rear views of the track assembly relative to a vehicle frame support.
Figure 8:
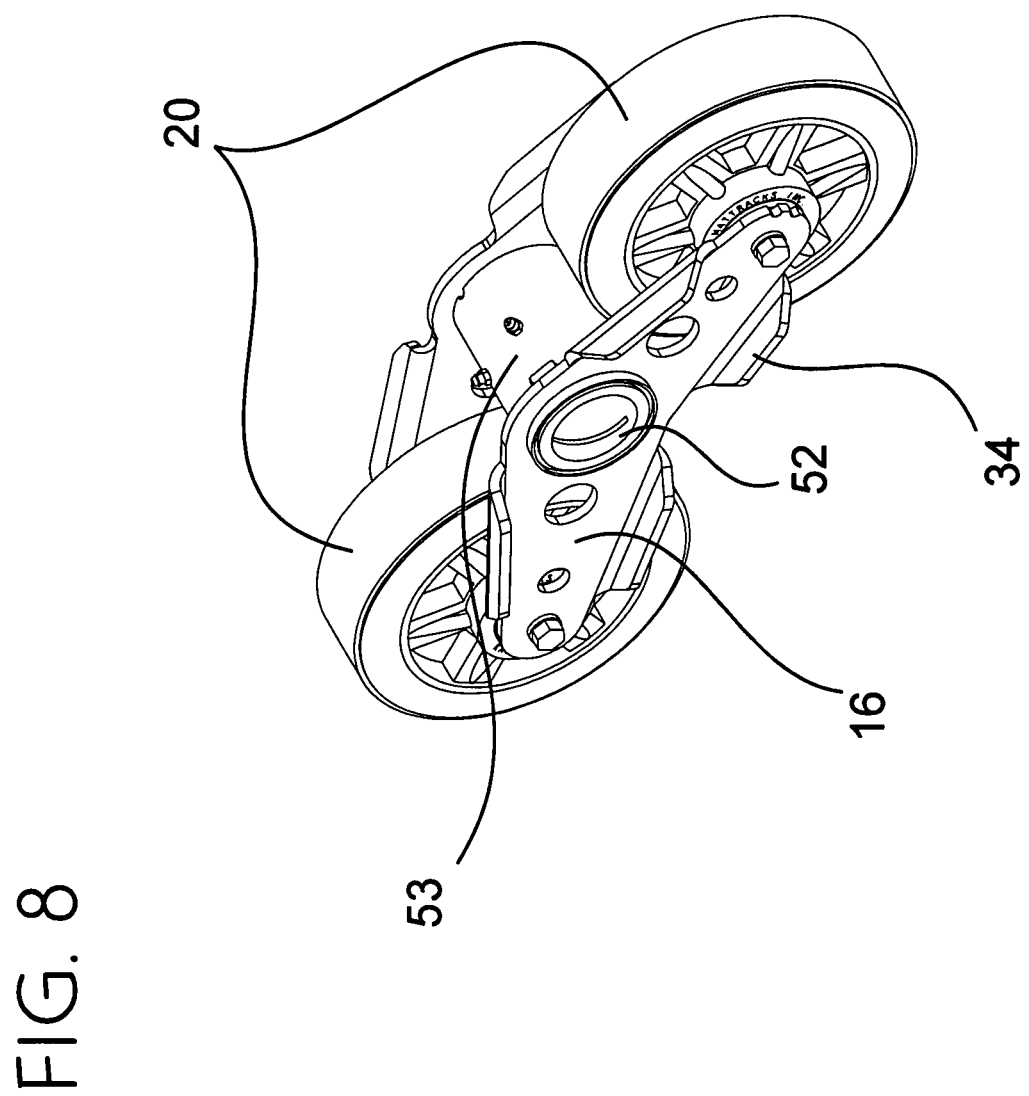
FIG. 8 is a perspective view of a single rocker arm suspension assembly removed from the track assembly.
Figure 9:
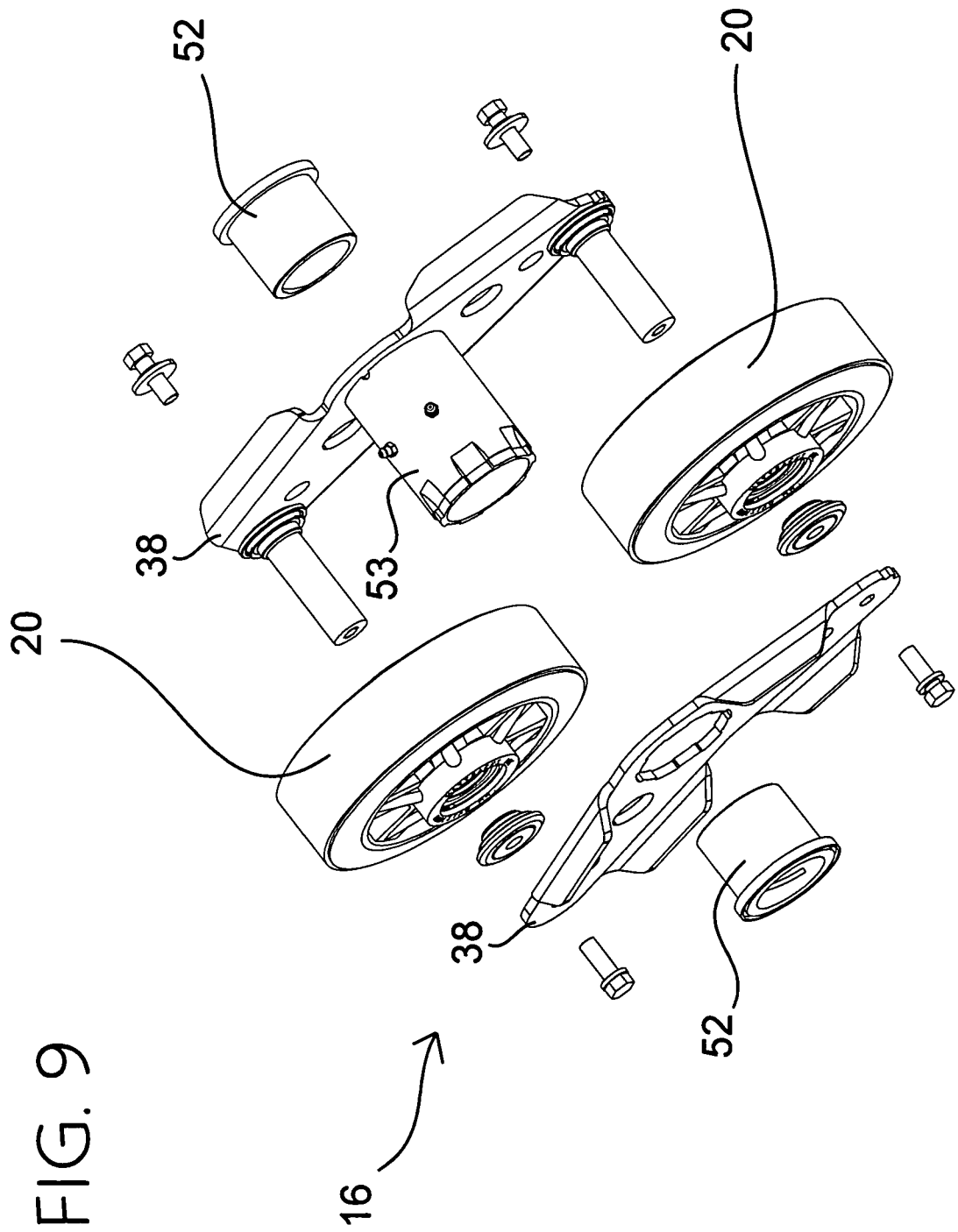
FIG. 9 is an exploded assembly view to a single rocker arm suspension assembly.

As apparent from FIGS. 6 and 7, the left and right rocker arm suspensions 16 are independently able to rise and fall as the track 10 flexes to conform and direct the passage of the track 10 over the terrain. The rocker arm suspensions 16 can be mounted to passively pivot or can be biased at the pivot axle 52 with resilient means (e.g. elastomer shims, bushings etc.) mounted internally or externally between the pivot housing 53 and axle 52 to bias rotation relative to a preferred initial condition.

The idler wheels 20 at each suspension 16 can also be constructed to provide an independent biasing of each idler wheel 20. The collective and/or independent biasing of the idler wheels 20 enhances the conformal interaction of the track with the terrain and reduces the overall pivoting movements of the track assembly 2 relative to the vehicle. The rocker arm suspensions 16 are not presently resiliently biased. Instead, stops 36 are provided to limit forward and/or aft rotation of the included rocker arms 38 at each suspension 16.

A reciprocating, extensible/retractable tensioner assembly 24 is mounted between the framework 12 and forward road wheels 40 to extend and retract the wheels 40 relative to the framework 12 to control the tension on the track 10. The drive sprocket 8 can again also be mounted to cooperate with the framework 12 to manipulate/rotate the sprocket 8 in an eccentric fashion to adjust track tension.

Separate suspension arms 42 project from the framework 12 forward of the drive sprocket 8 and support a pair of laterally offset pinch wheels 44 from a cross axle 68. The pinch wheels 44 are mounted to contact the external, ground engaging surface of the track 10. The pinch wheels 44 align with and overly the idler wheels 20. The pinch wheels 44 ride over the tops of ground lugs 46. The pinch wheels 44 cooperate with the underlying idler wheels 20 to pinch the track 10 and drive sprocket 8 between the idler wheels 20 and pinch wheels 44 to maintain contact between the sprocket 8 and interior drive lugs 14 and prevent track dislodgement.

The pinch wheels 44 could be mounted to align with gaps or channels between the terrain engaging ground lugs 46. In this configuration, the pinch wheels 44 could be laterally offset from the idler wheels 20. The potential for heat build up and premature track wear however suggests against such a mounting.

The pinch wheels 44 can be rigidly mounted to the framework 12 or can be resiliently biased to rotationally direct the track 10 toward the sprocket 8 and/or idler wheels 20 to prevent track dislodgement. In the fashion of the torsion control assembly 70 discussed below, a resilient, torsional bias can be implemented by fixing elastomer shims between transverse end portions of the suspension arms 42 that mount within a tubular cross frame piece 62 that transversely spans the framework 12, see FIG. 3.

In regard to the framework 12, the framework 12 is generally constructed as a box frame. The framework 12 comprises welded top, bottom and side plates 50 that are appropriately positioned to obtain desired support and strength. The axles 52 project from the side plates and support the rocker suspensions 16 and idler wheels 20. The stops 36 also project from the sides of the framework 12 to limit the pivot range of each idler wheel rocker arm suspension 16.

Other axles 54 and 56 transversely extend from the forward and aft ends of the framework 12 to support the forward and aft road wheels 40. The forward road wheels 40 are mounted to the axle 54 at the tensioner 24. The tensioner 24 is secured in sliding cooperation with the fore-end of the framework 12 and can be extended and retracted via threaded adjusters 58. A variety of alternative longitudinally adjustable linkages can be adapted to provide a desired reciprocating movement of the tensioner 24 to establish track tension.

Also transversely extending adjacent the drive sprocket 8 at the aft end of the framework 12 are tubular cross frame members 60 and 62. The tubular members 60 and 62 support acutely extending upright arms 64 that, in turn, support a bearing assembly 66 at the sprocket 8 that contains the vehicle axle and about which the drive sprocket 8 rotates. The forward cross member 62 also supports the lower ends of the pinch roller suspension arms 42. An axle 68 transversely extends between the suspension arms 42 and supports the pinch wheels 44. As noted above, the suspension arms 42 can be rigidly secured to the framework 12 at the end of the cross frame member 62 or can be torsionally biased relative the cross frame member 62 to place the track 10 under tension with the drive sprocket 8.

Secured to a forward end of the vehicle frame member 73 is a torsion control assembly 70 of the track assembly 2. The torsion control assembly 70 interacts with the vehicle frame member 73 and track framework 12 to limit pivoting movements of the track assembly 2. The torsion control assembly 70 particularly prevents unintended contact between the vehicle and track assembly 2.

The torsion controls assembly includes a vehicle clamp assembly 72 that secures the torsion control assembly 70 to a vehicle frame member 73. Pivot arms 74 extend from the clamp assembly 72 and support an outer torsion collar 76. The length of the upper arms 74 can be adjusted via overlapping slots and fasteners. An inner torsion tube 78 projects from the framework 12 and concentrically mounts inside the collar 76. The extension of the telescoped collar 76 and tube 78 is fixed with a fastener 81. Clamp plates 79 secure the vehicle clamp assembly 72 and pivot arms 74 to the collar 76.

Elastomer shims 77 are fitted between clamp plates 79 and the collar 76 to resist clockwise and counter-clockwise rotation of the track assembly framework 12 and pivot arms 74 relative to the vehicle and torsion tube 78. Movement of the forward end of the track assembly 2 is constrained by the torsion control assembly 70 to prevent contact between the track assembly 2 and vehicle. It is to be appreciated a variety of resilient fastener couplings can be provided between the track assembly 2 and vehicle.

Figure 10:
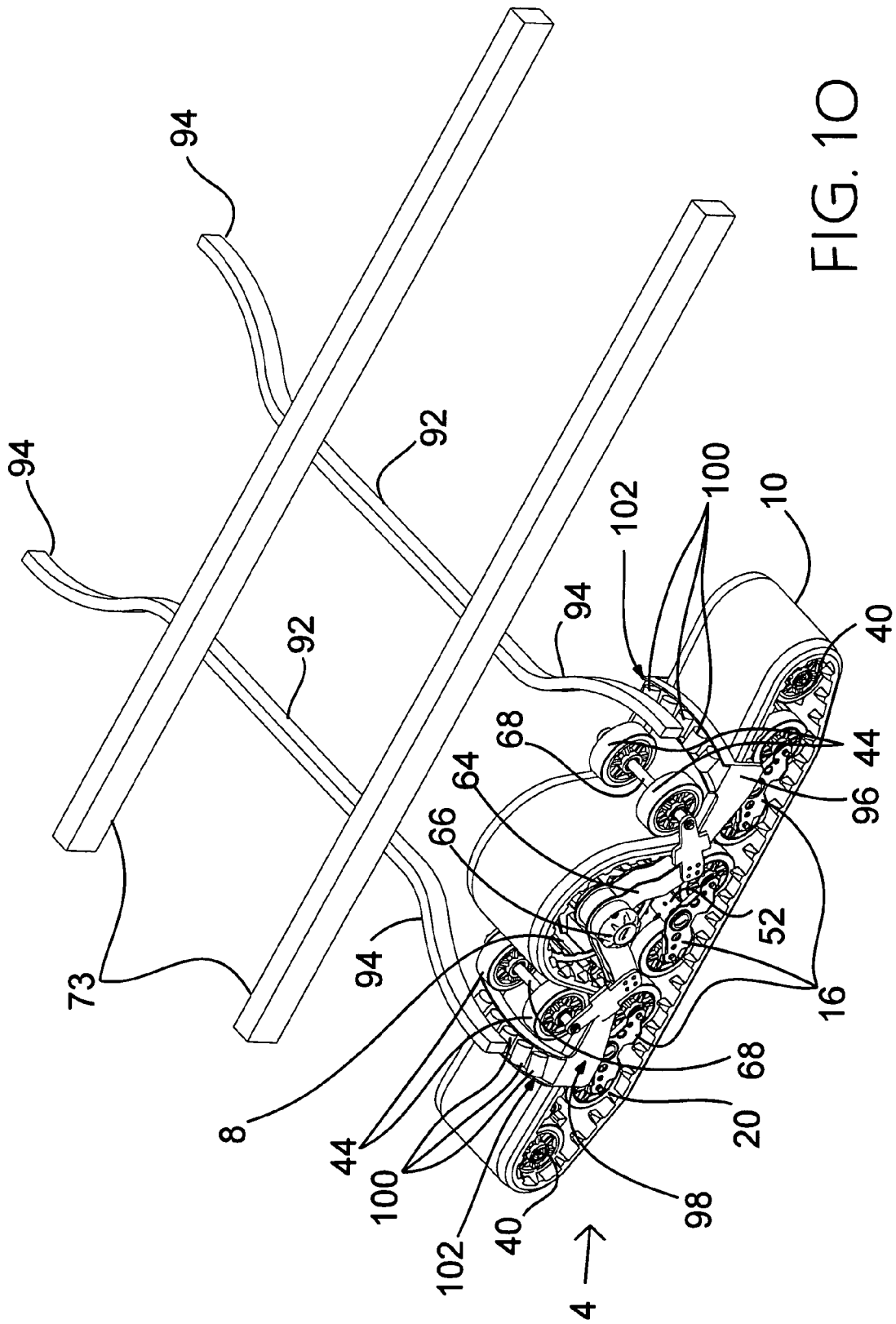
FIG. 10 is a perspective drawing to an alternative elongated track assembly modified to cooperate with a cross bracket that spans the vehicle frame having arcuate outboard ends mounted fore and aft of a center-mounted drive sprocket and wherein the arcuate cross bracket ends interact with resilient stops and roller bearings mounted to the track assembly framework to prevent vehicle damage over the steering range of the track assembly.
Figure 11:
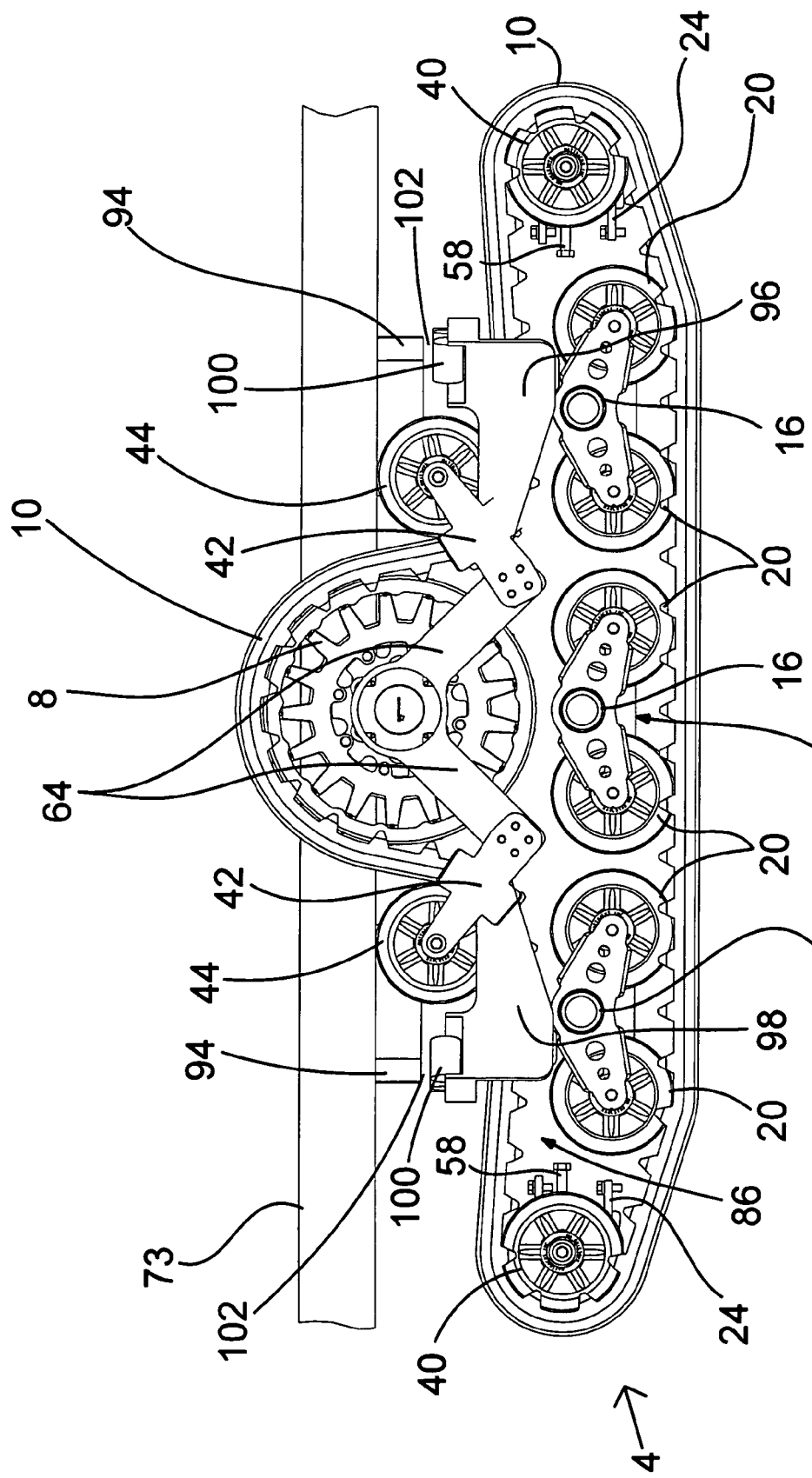
FIG. 11 is a left side view of the alternative elongated track assembly of FIG. 10.

With additional attention to FIGS. 10 and 11, the alternative track assembly 4 is shown in association to a pair of parallel vehicle frame pieces 73. The elongated track assembly 4 is constructed in a generally similar configuration to the track assembly 2. The track assembly 4 however is constructed to center or position the drive sprocket 8 between portions of the drive track that extend fore and aft of the drive sprocket 8. The track assembly 4 thus exhibits a more symmetrical longitudinal configuration relative to the drive sprocket 8 than the assembly 2 and centers the supported vehicle weight relative to the foot print of the track 10.

The track assembly 4 and associated framework 82, as with the track assembly 2, includes a drive sprocket 8, multiple serially mounted idler rocker arm suspensions 16 laterally opposed to each other and including paired forward and aft of idler wheels 20, forward and aft road wheels 40 and fore and aft track tensioners 24 coupled to the road wheels 40. Paired sets of pinch wheels 44 are mounted to the framework 82 forward and aft of the drive sprocket 8 to maintain contact between the track 10 and sprocket 8. Torsion control assemblies 70 (not shown) can be mounted as appropriate to fore and aft ends of the framework 82 to interact with the vehicle frame members 73 and prevent contact with and/or damage to the vehicle or track assembly 4.

Alternatively and/or in addition to including one or more torsion control assemblies 70, the framework 82 is modified to include to slide bearing sub-assemblies 102 that facilitate steering of the elongated track assembly relative to a supported vehicle. The modification provides a pair of cross members 92 that are transversely mounted to and span the vehicle frame members 73. The cross members 92 are mounted forward and aft of the pinch wheels 44. The cross members 92 include arcuate-shaped distal end pieces 94 that overly the track assembly 4. The arcuate ends 94 interact with the resilient and/or slippery slide bearing assemblies 102 mounted fore and aft of the pinch wheels 44.

The slide bearing assemblies 102 presently include arms 96 and 98 that longitudinally extend along the right and left lateral sides of the framework 82 to cross channel pieces positioned forward of the pinch wheels 44. The cross channel pieces span between the opposed distal ends of the arms 96 and 98, over the top of the drive track 10. The present cross channel pieces include recessed channel spaces although can comprise flat members.

Roller bearings 100 are mounted in the cross channel retainer pieces. A layer of a high density slippery material can also be mounted in or on the cross channel retainer pieces. A layer of a high density slippery material can also be mounted to the bottoms of the overlapping distal end pieces 94 of the cross members 92. With vertical movement of the track assembly 82 during steering and/or terrain changes, the distal end pieces 94 and/or slippery material engage the bearings 100. The ends 94 of the cross members 92 slide over the bearings 100 and/or slippery material to facilitate steering and prevent damage to the vehicle or track assembly 4.

The arc and shape of the distal end pieces 94 are constructed to accommodate the vehicle's steering range. If bearings 100 are provided, either roller or spherical bearings can be adapted to the cross channel retainer pieces. Any slippery material fitted to the cross channel retainers or end pieces 94 preferably is constructed from an appropriate high density, relatively slippery material. A further resilient interface (e.g. elastomer, pneumatic or hydraulic cushion or shock absorber) can be included between one or both of the cross channel retainer pieces and/or end pieces 94 to absorb shock and limit contact between the bearings 100 and end pieces 94.

While the invention is shown and described with respect to several presently considered track assemblies and several considered improvements, modifications and/or alternatives thereto, still other assemblies and arrangements may be suggested to those skilled in the art. It is to be appreciated also that the features of the foregoing vehicles and track assemblies can be arranged in different combinations.

For example, the vehicle chassis and framework can be constructed in different configurations with active and/or passive drive linkages; one or both of the forward and aft track assemblies can be mounted to be steered; the track frames can be constructed with torsion supports and/or slide bearing supports relative to the vehicle; the idler wheel rocker arm suspensions and/or pinch wheels can be unbiased or resiliently biased; and/or tracks of different lug configurations can be fitted to the track frame assemblies, among many other different combinations. The foregoing description should therefore be construed to include all those embodiments within the spirit and scope of the following claims.

What is claimed is:

1. A track assembly for a vehicle having a chassis, an engine and a plurality of driven axles and a plurality of passive axles, comprising:
   a) a track having an interior surface from which a plurality of drive lugs project and an exterior surface from which a plurality of ground lugs project and including a surface region defining a footprint whereat the track ground lugs engage the terrain; and
   b) a framework including a drive sprocket and a plurality of idler wheels supported from a plurality of pivoting rocker arm suspensions; a plurality of idler wheels mounted to a longitudinal frame, wherein said track is circumferentially trained around said framework such that the drive lugs engage said sprocket, wherein said rocker arm suspensions are coupled to a plurality of axles that transversely project from the longitudinal frame, wherein said idler wheels are aligned seriatim in longitudinal channel spaces between said drive lugs adjacent left and right lateral, longitudinal peripheral edges of said track at a bottom interior surface of the track, c) contact limiting means mounted between a vehicle frame member and the track framework to prevent the track from contacting the chassis and/or pivot relative to the vehicle frame, whereby said track assembly can rise and fall with changing terrain contours; and d) a frame piece that extends from said longitudinal frame to support at least one pinch wheel in contact with the ground engaging surface of said track and positioned adjacent said sprocket to assure contact between said drive lugs and said sprocket.

2. A track assembly as set forth in claim 1 wherein pivotal movements of said plurality of rocker arm suspensions are biased to resist rotation yet permit said track to flex with changes in said terrain.

3. A track assembly as set forth in claim 2 wherein the rocker arm suspensions are mounted to pivot independent of each other.

4. A track assembly as set forth in claim 2 including left and right pinch wheels mounted to contact longitudinal channel spaces between said ground lugs opposite to the interior channel spaces wherein said idler wheels rotate.

5. A track assembly as set forth in claim 4 wherein said framework includes stop members mounted to restrict pivotal motion of each of said rocker arm suspensions.

6. A track assembly as set forth in claim 1 wherein said contact limiting means comprises a clamp piece coupled to a vehicle frame member, first and second pivot arms, wherein one of said first and second arms is length adjustable and wherein one of said first and second pivot arms is coupled to said clamp piece and the other is coupled to said frame, and including a plurality of elastomer shims mounted to resiliently bias rotation of said first and second arms relative to said framework to prevent contact between said track and vehicle as the framework rises and falls with elevation changes in the terrain.

7. A track assembly as set forth in claim 1 wherein said contact limiting means comprises means transversely mounted between said track and said vehicle and including a surface whereat said track assembly can contact said surface to permit the track assembly to pivot without damaging said track assembly or vehicle as said track assembly rotates relative to said vehicle such as during steering.

8. A track assembly as set forth in claim 7 wherein said surface comprises a plurality of bearings mounted to engage a cross member mounted between the vehicle and said track.

9. A track assembly as set forth in claim 7 wherein said bearings are mounted in a carrier supported to said framework above said track.

10. A track assembly as set forth in claim 7 wherein said surface comprises a layer of material mounted to contact a cross member mounted between the vehicle and said track.

11. A vehicle comprising:
a) a chassis supporting an engine and a plurality of endless track assemblies, wherein each track assembly includes an endless track mounted around a drive sprocket and a plurality of idler wheels supported from a plurality of pivoting rocker arm suspensions mounted to vary the geometry of the track;

b) a torsion control means mounted between a vehicle frame member and a track framework to prevent the track from contacting the chassis, whereby said track assembly can rise and fall with changing terrain contours;

c) a pinch wheel in contact with a ground engaging surface of said track and positioned to maintain contact between drive lugs depending from an interior surface of said track with said sprocket; and d) a cross member transversely mounted relative to the vehicle frame and located to interact with a member supported between said track framework and cross member and having a surface whereat said cross member can contact said surface to permit the track assembly to pivot without damaging said track assembly or vehicle as said track assembly rotates relative to said vehicle, such as during steering.

12. A vehicle as set forth in claim 11 including first and second pinch wheels and wherein said first and second pinch wheels rotate in longitudinal channel spaces between said ground engaging lugs and opposed to longitudinal channel spaces between said drive lugs in which said idler wheels rotate to maintain contact between said drive lugs and sprocket and prevent lateral track movement of said track.

13. A vehicle as set forth in claim 11 wherein said slippery surface comprises a plurality of bearings.

14. A track assembly comprising:
a) a chassis supporting an engine and a plurality of endless track assemblies, wherein each track assembly includes an endless track mounted around a drive sprocket and a plurality of idler wheels supported from a plurality of pivoting rocker arm suspensions mounted to flex the track with elevation changes in the terrain;

b) a torsion control means mounted between a vehicle frame member and a track framework to prevent the track from contacting the chassis, whereby said track assembly can rise and fall with changing terrain contours;

c) wherein the track framework supports first and second pinch wheels in contact with a ground engaging surface of said track and positioned to assure contact between drive lugs depending from an interior surface of said track with said sprocket; and d) wherein the track framework includes a support having a surface mounted to contact and slide relative to a member mounted to the vehicle frame to permit the track assembly to pivot and vertically limit track assembly movement without damaging the vehicle.

15. A track assembly as set forth in claim 14 wherein said surface comprises a plurality of bearings mounted between the interacting track framework and vehicle frame such that the track assembly can be pivoted left and right to steer the vehicle without damaging the vehicle as the track assembly rises or falls with changing terrain contours.

16. A track assembly as set forth in claim 14 wherein said surface comprises a layer of material mounted to contact a cross member mounted between the vehicle and said track such that the track assembly can be pivoted left and right to steer the vehicle without damaging the vehicle as the track assembly rises or falls with changing terrain contours.

* * * * *